United States Patent
Naito et al.

(10) Patent No.: US 11,438,137 B2
(45) Date of Patent: Sep. 6, 2022

(54) ENCRYPTION DEVICE, DECRYPTION DEVICE, ENCRYPTION METHOD, DECRYPTION METHOD, AND COMPUTER READABLE MEDIUM

(71) Applicant: Mitsubishi Electric Corporation, Tokyo (JP)

(72) Inventors: Yusuke Naito, Tokyo (JP); Mitsuru Matsui, Tokyo (JP); Daisuke Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 288 days.

(21) Appl. No.: 16/630,741

(22) PCT Filed: Sep. 1, 2017

(86) PCT No.: PCT/JP2017/031639
§ 371 (c)(1),
(2) Date: Jan. 13, 2020

(87) PCT Pub. No.: WO2019/043921
PCT Pub. Date: Mar. 7, 2019

(65) Prior Publication Data
US 2020/0186328 A1 Jun. 11, 2020

(51) Int. Cl.
*H04L 9/06* (2006.01)
*G09C 1/00* (2006.01)

(52) U.S. Cl.
CPC .............. *H04L 9/0618* (2013.01); *G09C 1/00* (2013.01); *H04L 2209/12* (2013.01)

(58) Field of Classification Search
CPC .............. H04L 9/0618; H04L 2209/12; H04L 2209/122; H04L 2209/20; H04L 9/0637; H04L 9/06; H04L 9/32; G09C 1/00
See application file for complete search history.

(56) References Cited

U.S. PATENT DOCUMENTS 6,396,928 B1 * 5/2002 Zheng ................... H04L 9/3247
713/168
6,570,989 B1 * 5/2003 Ohmori ................. H04L 9/0625
380/42

(Continued)

FOREIGN PATENT DOCUMENTS

JP 2006-39206 A 2/2006
JP 2016-157055 A 9/2016

(Continued)

OTHER PUBLICATIONS

Sasaki, Y., Yasuda, K. (2015). How to Incorporate Associated Data in Sponge-Based Authenticated Encryption. In: Nyberg, K. (eds) Topics in Cryptology—CT-RSA 2015. CT-RSA 2015. Lecture Notes in Computer Science( ), vol. 9048.*

(Continued)

*Primary Examiner* — David Garcia Cervetti
(74) *Attorney, Agent, or Firm* — Birch, Stewart, Kolasch & Birch, LLP

(57) ABSTRACT

An encryption device divides a message M into blocks of b bits, so as to generate data M[1], . . . , data M[m]. The encryption device sets data $S_0$ of n=b+c bits to a variable S, updates the variable S by calculating a block cipher E using as input the variable S, then updates the variable S by calculating an exclusive OR using as input the variable S that has been updated and data X[i] that is data M[i] to which a bit string of c bits is added, and generates data C[i] by extracting b bits from the variable S that has been updated, for each integer i=1, . . . , m in ascending order. The encryption device generates a ciphertext C of the message M by concatenating the respective pieces of the data C[i] for each integer i=1, . . . , m. The encryption device extracts t bits from the variable S as an authenticator T, where t is an integer of 1 or greater.

11 Claims, 12 Drawing Sheets

(56) References Cited

U.S. PATENT DOCUMENTS

| | | | | |
|---|---|---|---|---|
| 7,529,366 | B2* | 5/2009 | Ichinose | H04L 9/0637 380/37 |
| 7,827,408 | B1* | 11/2010 | Gehringer | H04L 9/0643 380/259 |
| 7,949,129 | B2* | 5/2011 | Rogaway | H04L 9/0637 380/37 |
| 8,108,682 | B2* | 1/2012 | Watanabe | H04L 9/0643 713/168 |
| 8,121,284 | B2* | 2/2012 | Noda | H04L 9/0643 380/29 |
| 8,589,688 | B2* | 11/2013 | Minematsu | H04L 9/3242 713/180 |
| 9,166,793 | B2* | 10/2015 | Poovendran | H04L 9/3242 |
| 9,438,416 | B2* | 9/2016 | Kurdziel | H04L 9/0668 |
| 9,496,897 | B1* | 11/2016 | Triandopoulos | H04L 9/0618 |
| 9,497,021 | B2* | 11/2016 | Murray | H04L 9/003 |
| 9,537,657 | B1* | 1/2017 | Char | H04L 9/3226 |
| 9,680,653 | B1* | 6/2017 | Bradbury | H04L 9/0637 |
| 9,773,432 | B2* | 9/2017 | Ghosh | H04L 9/0631 |
| 9,787,475 | B2* | 10/2017 | Minematsu | H04L 9/0643 |
| 9,800,403 | B1* | 10/2017 | Gomes | H04L 9/3236 |
| 9,880,960 | B1* | 1/2018 | Diamant | G06F 13/4221 |
| 9,917,695 | B2* | 3/2018 | Yamada | H04L 9/30 |
| 10,268,832 | B1* | 4/2019 | Ciubotariu | G06F 21/6218 |
| 10,313,129 | B2* | 6/2019 | Gopal | G06F 9/30007 |
| 10,341,088 | B2* | 7/2019 | Minematsu | H04L 9/0625 |
| 10,387,350 | B1* | 8/2019 | Diamant | G06F 13/4027 |
| 10,560,269 | B2* | 2/2020 | Johnson | H04L 9/3239 |
| 10,783,269 | B1* | 9/2020 | Shraer | H04L 9/3242 |
| 10,904,231 | B2* | 1/2021 | Sridharan | H04L 63/064 |
| 11,095,453 | B2* | 8/2021 | Mizoguchi | H04L 9/3228 |
| 11,153,068 | B2* | 10/2021 | Isobe | H04L 9/002 |
| 2002/0071552 | A1* | 6/2002 | Rogaway | H04L 9/3242 380/37 |
| 2003/0108196 | A1* | 6/2003 | Kirichenko | H04L 9/0637 380/37 |
| 2004/0019783 | A1* | 1/2004 | Hawkes | H04L 9/0637 380/37 |
| 2004/0039919 | A1* | 2/2004 | Takayama | G06Q 20/24 713/180 |
| 2004/0177252 | A1* | 9/2004 | Vallee | H04L 9/3247 713/170 |
| 2004/0250095 | A1* | 12/2004 | Feldman | H04L 9/12 713/191 |
| 2004/0252836 | A1* | 12/2004 | Yoshida | H04L 9/3242 380/268 |
| 2005/0108555 | A1* | 5/2005 | Sibert | G06F 21/64 713/187 |
| 2006/0026442 | A1 | 2/2006 | Ittogi | |
| 2006/0195402 | A1* | 8/2006 | Malina | H04L 63/1441 705/50 |
| 2006/0285684 | A1* | 12/2006 | Rogaway | H04L 9/0637 380/37 |
| 2007/0081668 | A1* | 4/2007 | McGrew | H04L 9/002 380/37 |
| 2008/0005564 | A1* | 1/2008 | Agarwal | H04L 9/0822 380/278 |
| 2008/0069347 | A1* | 3/2008 | Brown | H04L 9/3066 380/45 |
| 2008/0084996 | A1* | 4/2008 | Chen | H04L 9/0637 380/28 |
| 2008/0112561 | A1* | 5/2008 | Kim | H04L 9/3242 380/42 |
| 2008/0172562 | A1* | 7/2008 | Cachin | H04L 9/0637 711/E12.098 |
| 2008/0222414 | A1* | 9/2008 | Wang | H04L 9/3239 713/161 |
| 2008/0250297 | A1* | 10/2008 | Chung | H03M 13/091 708/530 |
| 2008/0260147 | A1* | 10/2008 | Shin | H04L 9/0643 380/46 |
| 2009/0034725 | A1* | 2/2009 | Davies, Sr | H04L 63/083 380/255 |
| 2009/0138710 | A1 | 5/2009 | Minematsu | |
| 2009/0196416 | A1* | 8/2009 | Minematsu | H04L 9/0631 380/28 |
| 2009/0208018 | A1* | 8/2009 | Buckingham | G06F 21/80 380/277 |
| 2010/0027783 | A1* | 2/2010 | Yup | H04L 9/0631 380/44 |
| 2010/0067698 | A1* | 3/2010 | Hahn | H04L 63/123 380/270 |
| 2010/0088517 | A1* | 4/2010 | Piersol | H04L 9/32 713/168 |
| 2010/0246809 | A1 | 9/2010 | Noda et al. | |
| 2010/0268960 | A1* | 10/2010 | Moffat | H04L 9/0643 713/181 |
| 2010/0303229 | A1* | 12/2010 | Unruh | H04L 9/0643 380/28 |
| 2011/0026712 | A1* | 2/2011 | Ducharme | H04L 9/0643 380/287 |
| 2011/0051927 | A1* | 3/2011 | Murray | H04L 9/003 380/28 |
| 2011/0138192 | A1* | 6/2011 | Kocher | G06F 21/575 713/189 |
| 2011/0150225 | A1* | 6/2011 | Minematsu | H04L 9/0625 380/277 |
| 2011/0238989 | A1* | 9/2011 | Machani | H04L 9/3242 713/168 |
| 2011/0255689 | A1* | 10/2011 | Bolotov | H04L 9/0631 380/42 |
| 2012/0008767 | A1* | 1/2012 | Smith | H04L 9/0631 380/28 |
| 2012/0076293 | A1* | 3/2012 | Smith | H04L 9/0656 380/28 |
| 2012/0096273 | A1* | 4/2012 | Campagna | H04L 9/3247 713/176 |
| 2012/0096274 | A1* | 4/2012 | Campagna | H04L 9/3242 713/176 |
| 2013/0145169 | A1* | 6/2013 | Poovendran | H04L 9/0643 713/181 |
| 2014/0101445 | A1* | 4/2014 | Giladi | A61K 47/40 713/168 |
| 2014/0146964 | A1* | 5/2014 | Yamada | H04L 9/0637 380/28 |
| 2014/0211938 | A1* | 7/2014 | Campagna | H04L 9/3252 380/44 |
| 2014/0317407 | A1* | 10/2014 | Minematsu | G06F 21/64 713/170 |
| 2014/0365779 | A1* | 12/2014 | Brown | H04L 9/3252 713/176 |
| 2015/0149771 | A1* | 5/2015 | Yen | G06F 21/6209 713/165 |
| 2016/0006568 | A1* | 1/2016 | Minematsu | H04L 9/3242 713/189 |
| 2016/0173276 | A1 | 6/2016 | Minematsu | |
| 2017/0061833 | A1* | 3/2017 | Joye | H04L 9/14 |
| 2017/0126409 | A1* | 5/2017 | Freudiger | H04L 9/14 |
| 2017/0272239 | A1* | 9/2017 | Minematsu | H04L 9/0618 |
| 2017/0293765 | A1* | 10/2017 | Kang | G06F 21/602 |
| 2017/0353440 | A1* | 12/2017 | Murakami | H04L 9/0643 |
| 2017/0364688 | A1* | 12/2017 | Desai | G06F 21/57 |
| 2017/0366340 | A1* | 12/2017 | Wyseur | H04L 9/3242 |
| 2018/0241544 | A1* | 8/2018 | Naito | H04L 9/32 |
| 2018/0253559 | A1* | 9/2018 | Satpathy | G06F 21/6209 |
| 2019/0268136 | A1* | 8/2019 | Ordas | H04L 9/0631 |
| 2020/0076611 | A1* | 3/2020 | Minematsu | H04W 12/06 |
| 2020/0186328 | A1* | 6/2020 | Naito | H04L 9/0618 |
| 2021/0314088 | A1* | 10/2021 | Jain | H03M 13/091 |

FOREIGN PATENT DOCUMENTS

| | | |
|---|---|---|
| WO | WO 2007/052477 A1 | 5/2007 |
| WO | WO 2007/105709 A1 | 9/2007 |
| WO | WO 2015/015702 A1 | 2/2015 |

(56) References Cited

OTHER PUBLICATIONS

Office Action dated Nov. 5, 2020 issued in corresponding European Application No. 17 923 165.9.
"Advanced Encryption Standard (AES)", Federal Information Processing Standards Publication 197, Nov. 26, 2001, pp. 1-51.
Dobraunig et al., "ASCON v1.2", Submission to the CAESAR Competition, Sep. 15, 2016, pp. 1-26.
Ella Rose, "Can we use the sponge construct to efficiently authenticate any cipher?", Cryptography Stack Exchange, Apr. 13, 2017, pp. 1-2.
International Search Report issued in PCT/JP2017/031639 (PCT/ISA/210), dated Dec. 5, 2017.
John Meacham, "Is a strong block cipher usable as a strong sponge function?", Cryptography Stack Exchange, Sep. 1, 2015, p. 1.
Morris Dworkin, "Recommendation for Block Cipher Modes of Operation: Galois/Counter Mode (GCM) and GMAC", NIST Special Publication 800-38D, Nov. 2007, pp. 1-38.
Wu et al., "The JAMBU Lightweight Authentication Encryption Mode (v2.1)", Submitted to the CAESAR Competition, Sep. 15, 2016, pp. 1-19.
Extended European Search Report, dated May 4, 2020, for European Application No. 17923165.9.
Sasaki et al., "How to Incorporate Associated Data in Sponge-Based Authenticated Encryption", International Conference on Financial Cryptography and Data Security, Mar. 11, 2015, pp. 353-370 (18 pages).
Wetzels et al., "Sponges and Engines: An Introduction to Keccak and Keyak", IACR, International Association for Cryptologic Research, Jan. 12, 2016, 30 pages.
European Summons to Attend Oral Proceedings Pursuant to Rule 115(1) EPC for European Application No. 17923165.9, dated Oct. 5, 2021.
European Brief Communication tor European Application No. 17923165.9, dated Apr. 27, 2822.
Hirose, "Sequential Hashing with Minimum Padding," IEICE Technical Report, vol. 116, No. 289, Nov. 2016, pp. 27-32 {6 pages total).
Communication pursuant to article 94(3) EPC dated May 18, 2022 in corresponding European Application No. 17 923 165.9.

\* cited by examiner

ENCRYPTION DEVICE, DECRYPTION DEVICE, ENCRYPTION METHOD, DECRYPTION METHOD, AND COMPUTER READABLE MEDIUM

TECHNICAL FIELD

The present invention relates to an authenticated encryption algorithm using a block cipher.

BACKGROUND ART

An authenticated encryption algorithm is an encryption algorithm that realizes a confidentiality function and a tampering detection function. The use of the authenticated encryption algorithm allows communication of a message between two parties while maintaining confidentiality, and also allows a receiver to check whether or not the transmitted message has been tampered with.

The authenticated encryption algorithm includes two algorithms: an encryption function Enc and a decryption function Dec.

The encryption function Enc is a function that takes as input a secret key K, an initial parameter N, public data A, and a message m, and outputs a ciphertext C and an authenticator T for tampering detection. Note that a different value is used as the initial parameter N each time encryption is performed.

The decryption function Dec is a function that takes as input the secret key K, the initial parameter N, the public data A, the ciphertext C, and the authenticator T for tampering detection, and outputs the message m if the ciphertext C or the like has not been tampered with, and does not output the message m if the ciphertext C or the like has been tampered with.

It is assumed that a sender Alice and a receiver Bob communicate using the authenticated encryption algorithm. In this case, the sender Alice calculates a ciphertext C and an authenticator T for tampering detection from a secret key K, an initial parameter N, public data A, and a message m, using the encryption function Enc. Then, the sender Alice sends the initial parameter N, the public data A, the ciphertext C, and the authenticator T for tampering detection to the receiver Bob. The receiver Bob uses, as input to the decryption function Dec, the secret key K, the initial parameter N, the public data A, the ciphertext C, and the authenticator T for tampering detection. If none of the initial parameter N, the public data A, the ciphertext C, and the authenticator T for tampering detection has been tampered with, the decryption function Dec outputs the message m.

Note that the secret key K is shared between Alice and Bob in advance. The public data A is a value that may be made public. The public data A may be omitted.

As a method for constructing an authenticated encryption algorithm, there is a method using a block cipher such as the Advanced Encryption Standard (AES) described in Non-Patent Literature 1.

The block cipher is composed of an encryption function E and a decryption function D. The encryption function E is a function that takes as input a key K and a message m of n bits, and outputs a ciphertext c of n bits. This will be denoted as $c=E_K(m)$. The decryption function D is a function that takes as input the key K and the ciphertext c of n bits, and outputs the message m of n bits. This will be denoted as $m=D_K(c)$.

A size n of the message m and the ciphertext c of the block cipher is called a block size. When the key K is fixed, the encryption function E and the decryption function D of the block cipher are permutation functions of n bits. The block size n is a parameter defined by the block cipher. In the AES, n is 128.

The encryption function Enc of authenticated encryption is constructed using the encryption function E of the block cipher. The decryption function Dec of authenticated encryption is constructed using the encryption function E or the decryption function D of the block cipher.

When the decryption function Dec of authenticated encryption is constructed using the decryption function D of the block cipher, both the encryption function E and the decryption function D of the block cipher are used in authenticated encryption. When both the encryption function E and the decryption function D of the block cipher are used in authenticated encryption, both the encryption function E and the decryption function D need to be implemented. For example, for implementation in software, programs of both the encryption function E and the decryption function D are needed. For implementation in hardware, circuits or the like of both the encryption function E and the decryption function D are needed.

On the other hand, when the decryption function Dec of authenticated encryption uses the encryption function E of the block cipher, only the encryption function E of the block cipher is used in authenticated encryption. When only the encryption function E of the block cipher is used in authenticated encryption, there is no need to implement the decryption function D. Therefore, the size of software or hardware is small. The size of software and the size of hardware are called implementation sizes.

As an authenticated encryption algorithm that can be implemented with only the encryption function E of the block cipher, there is AES-GCM described in Non-Patent Literature 2. AES-GCM realizes the encryption function Enc and the decryption function Dec of authenticated encryption by using a counter mode in order to realize the confidentiality function. AES-GCM also uses multiplication over a Galois field $GF(2^n)$ in order to realize the tampering detection function. In the counter mode, which is an algorithm of the confidentiality function, an exclusive OR (XOR) operation is used in addition to the encryption function E of the block cipher.

Therefore, AES-GCM requires the implementation of the multiplication over the Galois field $GF(2^n)$ and the exclusive OR, in addition to the encryption function E.

Non-Patent Literature 3 describes an authenticated encryption algorithm JAMBU constructed with only the encryption function E and the exclusive OR (XOR). JAMBU does not require the multiplication over the Galois field $GF(2^n)$, so that the implementation size is smaller than that of AES-GCM.

The encryption function Enc or the decryption function Dec of the authenticated encryption algorithm JAMBU performs encryption while updating an internal variable of $3n/2$ bits using the encryption function E of the block cipher.

CITATION LIST

Non-Patent Literature

Non-Patent Literature 1: FIPS 197, Advanced Encryption Standard (AES).

Non-Patent Literature 2: NIST Special Publication 800-38D, Recommendation for Block Cipher Modes of Operation: Galois/Counter Mode (GCM) and GMAC.

Non-Patent Literature 3: Submitted to the CAESAR competition, The JAMBU Lightweight Authentication Encryption Mode (v2.1).

SUMMARY OF INVENTION

Technical Problem

In addition to the implementation size, the size of the internal variable used during execution of the authenticated encryption algorithm is also important. In an inexpensive device such as an embedded device, the size of RAM and the size of ROM are small. In a case like this where the implementation environment is limited, it is desirable that the implementation size and the size of the internal variable be as small as possible. The internal variable is a value to be updated by the block cipher E. For example, the size of the internal variable is 3n/2 bits in JAMBU. In AES-GCM, the size of the internal variable is required to be 2n bits or greater.

It is an object of the present invention to realize an authenticated encryption algorithm with which the implementation size and the size of an internal variable can be made small.

Solution to Problem

An encryption device according to the present invention includes:
 a division unit to divide a message M into blocks of b bits, so as to generate data M[1], ..., data M[m] each having b bits;
 a function calculation unit to set data $S_0$ of n=b+c bits to a variable S, update the variable S with data obtained by calculating a block cipher E using as input the variable S, then update the variable S with data obtained by calculating an exclusive OR using as input the variable S that has been updated and data X[i] that is data M[i] to which a bit string of c bits is added, and generate data C[i] by extracting b bits from the variable S that has been updated, for each integer i=1, ..., m in ascending order;
 a ciphertext generation unit to generate a ciphertext C of the message M by concatenating respective pieces of the data C[i] for each integer i=1, ..., m; and
 an authenticator generation unit to extract, as an authenticator T, t bits from the variable S that has been updated most recently by the function calculation unit, where t is an integer of 1 or greater.

Advantageous Effects of Invention

In the present invention, an authenticated encryption algorithm can be constructed from an encryption function E of a block cipher and an exclusive OR (XOR). The size of a variable S, which is an internal variable, is n bits. Therefore, the size of the internal variable can be made smaller than that of the authenticated encryption algorithm JAMBU while the implementation size is equivalent to that of the authenticated encryption algorithm JAMBU.

DESCRIPTION OF EMBODIMENTS

First Embodiment

Figure 1:
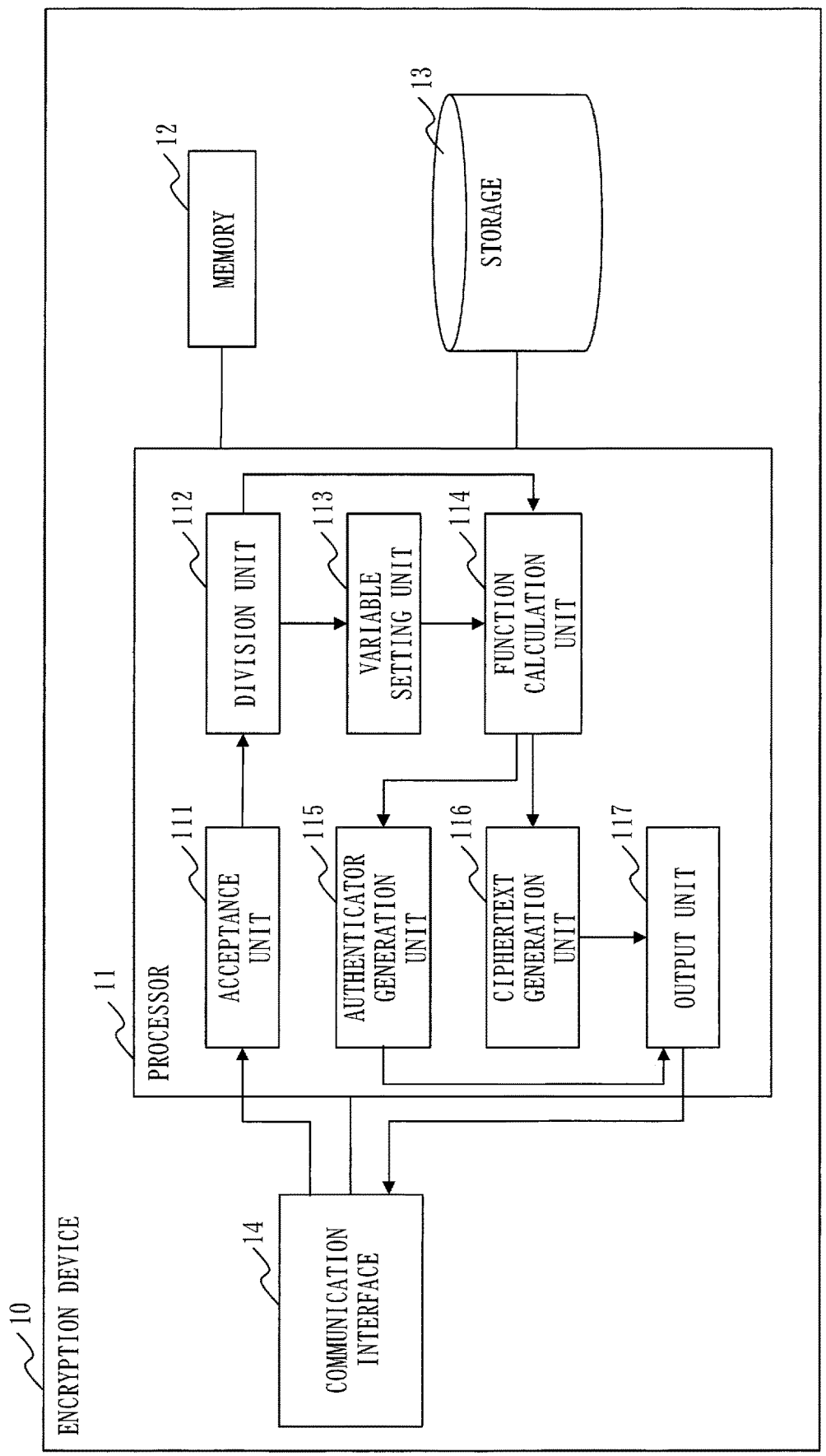
FIG. 1 is a configuration diagram of an encryption device 10 according to a first embodiment.

In a first embodiment, an authenticated encryption algorithm constructed using an encryption function E of a block cipher with a block size n will be described.

* Description of Variables and Notation *

Variables and notation in the following description will be described.

An integer b, an integer c, an integer b", and an integer c" satisfy the relationships c=n−b and c"=n−b". An integer t satisfies the relationship t≤n.

A y-bit representation of an integer x will be denoted as str[y](x). For example, str[4](2) denotes 0010. The most significant w bits of a bit string z of n bits will be denoted as msb[w](z), and the least significant w bits will be denoted as Lsb[w](z). The bit length of a bit string w will be denoted as Len(w).

Each of const[1], const[2], and const[3] is an integer that is not 0 and is a value different from one another.

* Description of Configuration *

A configuration of an encryption device 10 according to the first embodiment will be described with reference to FIG. 1.

The encryption device 10 includes hardware of a processor 11, a memory 12, a storage 13, and a communication interface 14. The processor 11 is connected with other hardware components via signal lines and controls these other hardware components.

The encryption device 10 includes, as functional components, an acceptance unit 111, a division unit 112, a variable setting unit 113, a function calculation unit 114, an authenticator generation unit 115, a ciphertext generation unit 116, and an output unit 117. The functions of the functional components of the encryption device 10 are realized by software.

The storage 13 stores programs for realizing the functions of the functional components of the encryption device 10. These programs are read into the memory 12 by the processor 11 and executed by the processor 11. This realizes the functions of the functional components of the encryption device 10.

A configuration of a decryption device 20 according to the first embodiment will be described with reference to FIG. 2.

The decryption device 20 includes hardware of a processor 21, a memory 22, a storage 23, and a communication interface 24. The processor 21 is connected with other hardware components via signal lines and controls these other hardware components.

The decryption device 20 includes, as functional components, an acceptance unit 211, a division unit 212, a variable setting unit 213, a function calculation unit 214, an authenticator generation unit 215, a message generation unit 216, and an output unit 217. The functions of the functional components of the decryption device 20 are realized by software.

The storage 23 stores programs for realizing the functions of the functional components of the decryption device 20. These programs are read into the memory 22 by the processor 21 and executed by the processor 21. This realizes the functions of the functional components of the decryption device 20.

Each of the processors 11 and 21 is an integrated circuit (IC) that performs processing. As a specific example, each of the processors 11 and 21 is a central processing unit (CPU), a digital signal processor (DSP), or a graphics processing unit (GPU).

Each of the memories 12 and 22 is a storage device to temporarily store data. As a specific example, each of the memories 12 and 22 is a static random access memory (SRAM) or a dynamic random access memory (DRAM).

Each of the storages 13 and 23 is a storage device to store data. As a specific example, each of the storages 13 and 23 is a hard disk drive (HDD). Alternatively, each of the storages 13 and 23 may be a portable storage medium, such as a Secure Digital (SD) memory card, CompactFlash (CF, registered trademark), a NAND flash, a flexible disk, an optical disc, a compact disc, a Blu-ray (registered trademark) disc, or a digital versatile disk (DVD).

Each of the communication interfaces 14 and 24 is an interface to communicate with an external device. As a specific example, each of the communication interfaces 14 and 24 is a port of Ethernet (registered trademark), Universal Serial Bus (USB), or High-Definition Multimedia Interface (HDMI, registered trademark).

* Description of Operation *

Operation of the encryption device 10 and the decryption device 20 according to the first embodiment will be described with reference to FIGS. 3 to 6.

The operation of the encryption device 10 according to the first embodiment corresponds to an encryption method according to the first embodiment. The operation of the encryption device 10 according to the first embodiment also corresponds to processes of an encryption program according to the first embodiment.

The operation of the decryption device 20 according to the first embodiment corresponds to a decryption method according to the first embodiment. The operation of the decryption device 20 according to the first embodiment also corresponds to processes of a decryption program according to the first embodiment.

The operation of the encryption device 10 according to the first embodiment will be described with reference to FIGS. 3 and 4.

(Step S11: Acceptance Process)

The acceptance unit 111 accepts input of a message M to be encrypted.

Specifically, the acceptance unit 111 accepts, via the communication interface 14, the message M that is input by a user through operation of an input device.

(Step S12: Division Process)

The division unit 112 determines whether or not a length Len(M) of the message M accepted in step S11 is a multiple of b bits. If the length Len(M) is not a multiple of b bits, 1 is added to the end of the message M and a bit string of 0 is further added to the end so that the length Len(M) is a multiple of b bits, so as to generate data M*. On the other hand, if the length Len(M) is a multiple of b bits, the message M is treated as the data M*.

The division unit 112 divides the data M* from the beginning into blocks of b bits, so as to generate data M[1], . . . , data M[m], where "m" is an integer of 1 or greater.

(Step S13: Variable Setting Process)

The variable setting unit 113 sets, to a variable S internal to the encryption device 10, data obtained by calculating an exclusive OR using, as input, data $S_0$ of n bits and data Y that is a concatenation of an initial parameter N of b" bits and a constant const[1] of c" bits. That is, the variable setting unit 113 calculates $S=S_0$ XOR (N∥const[1]).

In the first embodiment, the data $S_0$ is fixed data IV. The variable S internal to the encryption device 10 is a variable stored in the memory 12 of the encryption device 10.

(Step S14: Function Calculation Process)

The function calculation unit 114 executes the following processes A to C for each integer i=1, . . . , m in ascending order.

(Process A)

The function calculation unit 114 updates the variable S by setting, to the variable S, data obtained by calculating the encryption function E of the block cipher using as input the variable S and a key K. Note here that the key K is shared between the encryption device 10 and the decryption device 20 in advance.

That is, the function calculation unit 114 calculates $S=E_K(S)$.

(Process B)

The function calculation unit 114 updates the variable S by setting, to the variable S, data obtained by calculating an exclusive OR using as input the variable S updated in the process A and data X[i] that is data M[i] to which a bit string of c bits is added. Here, the function calculation unit 114 uses the data X[i] that is the data M[i] to the end of which c bits of 0 are added.

That is, the function calculation unit 114 calculates $S=S$ XOR $(M[i]\|0^c)$.

(Process C)

The function calculation unit 114 extracts b bits from the variable S updated in the process B so as to generate data C[i]. Here, the function calculation unit 114 extracts the most significant b bits of the variable S so as to generate the data C[i].

That is, the function calculation unit 114 calculates $C[i]=msb[b](S)$.

(Step S15: Authenticator Generation Process)

If the length of the message M is a multiple of b bits, the authenticator generation unit 115 updates the variable S by setting, to the variable S, data obtained by calculating an exclusive OR using as input the variable S calculated in step S14 and a constant const[2]. Here, the authenticator generation unit 115 calculates the exclusive OR using as input the variable S and data that is a bit string of c bits representing the constant const[2] to the beginning of which b bits of 0 are added. That is, the authenticator generation unit 115 calculates S=S XOR ($0^b$∥str[c](const[2])).

On the other hand, if the length of the message M is not a multiple of b bits, the authenticator generation unit 115 updates the variable S by setting, to the variable S, data obtained by calculating an exclusive OR using as input the variable S calculated in step S14 and a constant const[3]. Here, the authenticator generation unit 115 calculates the exclusive OR using as input the variable S and data that is a bit string of c bits representing the constant const[3] to the beginning of which b bits of 0 are added. That is, the authenticator generation unit 115 calculates S=S XOR ($0^b$∥str[c](const[3])).

The authenticator generation unit 115 updates the variable S by setting, to the variable S, data obtained by calculating the encryption function E using as input the variable S that has been updated. That is, the authenticator generation unit 115 calculates S=$E_K$(S).

Then, the authenticator generation unit 115 extracts, as an authenticator T, t bits from the variable S that has been updated. Here, the authenticator generation unit 115 extracts the most significant t bits from the variable S, so as to generate the authenticator T. That is, the authenticator generation unit 115 calculates T=msb[t](S).

(Step S16: Ciphertext Generation Process)

The ciphertext generation unit 116 concatenates the respective pieces of the data c[i] for each integer i=1, . . . , m calculated in step S14. The ciphertext generation unit 116 extracts only the most significant bits of the length Len(M) of the message M from the concatenated data, so as to generate a ciphertext C that is the encrypted message M.

That is, the ciphertext generation unit 116 calculates C=msb[Len(M)](C[1]∥ . . . ∥C[m−1]∥C[m]).

(Step S17: Output Process)

The output unit 117 outputs the authenticator T calculated in step S15 and the ciphertext C generated in step S16.

Specifically, the output unit 117 transmits the authenticator T and the ciphertext C to the decryption device 20 via the communication interface 14.

The operation of the decryption device 20 according to the first embodiment will be described with reference to FIGS. 5 and 6.

(Step S21: Acceptance Process)

The acceptance unit 211 accepts input of the authenticator T and the ciphertext C.

Specifically, the acceptance unit 111 receives, via the communication interface 24, the authenticator T and the ciphertext C transmitted by the encryption device 10.

(Step S22: Division Process)

The division unit 212 divides the ciphertext C accepted in step S21 from the beginning into blocks of b bits, so as to generate data C[1], . . . , data C[m].

If a length Len(C) of the ciphertext C is not a multiple of b bits, a length Len(C[m]) of the data C[m] is shorter than b bits. If the length Len(C) is a multiple of b bits, the length Len(C[m]) is b bits.

(Step S23: Variable Setting Process)

The variable setting unit 213 sets, to a variable S internal to the decryption device 20, data obtained by calculating an exclusive OR using, as input, data $S_0$ of n bits and data Y that is a concatenation of the initial parameter N of b" bits and the constant const[1] of c" bits. That is, the variable setting unit 213 calculates S=$S_0$ XOR (N∥const[1]).

In the first embodiment, the data $S_0$ is the fixed value IV. The data $S_0$ that is set here is the same data as the data $S_0$ that is set in step S13 of FIG. 3. The variable S internal to the decryption device 20 is a variable stored in the memory 22 of the decryption device 20.

(Step S24: Function Calculation Process)

The function calculation unit 214 executes the following processes A' to C' for each integer i=1, . . . , m−1 in ascending order. Then, the function calculation unit 214 executes processes D' to E'.

(Process A')

The function calculation unit 214 updates the variable S by setting, to the variable S, data obtained by calculating the encryption function E of the block cipher using as input the variable S and the key K. Note here that the key K is shared between the encryption device 10 and the decryption device 20 in advance.

That is, the function calculation unit 214 calculates S=$E_K$(S).

(Process B')

The function calculation unit 214 calculates an exclusive OR using, as input, b bits extracted from the variable S updated in the process A' and data C[i], so as to calculate data M[i]. Here, the function calculation unit 214 extracts the most significant b bits of the variable S updated in the process A', and calculates the exclusive OR using as input the extracted data and the data C[i].

That is, the function calculation unit 214 calculates M[i]=C[i] XOR msb[b](S).

(Process C')

The function calculation unit 214 updates the variable S by setting, to the variable S, data obtained by calculating an exclusive OR using as input the variable S updated in the process A' and data X[i] that is the data M[i] to which a bit string of c bits is added. Here, the function calculation unit 214 uses the data X[i] that is the data M[i] to the end of which c bits of 0 are added.

That is, the function calculation unit 214 calculates S=S XOR (M[i]∥$0^c$).

(Process D')

The function calculation unit 214 calculates an exclusive OR using, as input, bits of the length Len(C[m]) extracted from the beginning of the variable S updated in the process C' and the data C[m], so as to calculate data M[m].

That is, the function calculation unit 214 calculates M[m]=C[m] XOR msb[Len(C[m])](S).

(Process E')

If a length Len(M[m]) of the data M[m] generated in the process D' is shorter than b bits, the function calculation unit 214 adds 1 to the end of the data M[m] and further adds a bit string of 0 to the end so that the length Len(M[m]) is b bits, so as to generate data M*[m]. On the other hand, if the length Len(M[m]) is b bits, the data M[m] is treated as the data M*[m].

Then, the function calculation unit 214 updates the variable S by setting, to the variable S, data obtained by calculating an exclusive OR using as input the variable S updated in the process C' and data X[m] that is the data M*[m] to which a bit string of c bits is added. Here, the function calculation unit 214 uses the data X[m] that is the data M*[m] to the end of which c bits of 0 are added.

That is, the function calculation unit 214 calculates S=S XOR (M*[m]∥$0^c$).

(Step S25: Authenticator Generation Process)

If the length of the ciphertext C is a multiple of b bits, the authenticator generation unit 215 updates the variable S by setting, to the variable S, data obtained by calculating an exclusive OR using as input the variable S calculated in step S24 and the constant const[2]. Here, the authenticator generation unit 215 calculates the exclusive OR using as input the variable S and data that is a bit string of c bits representing the constant const[2] to the beginning of which b bits of 0 are added. That is, the authenticator generation unit 215 calculates S=S XOR ($0^b$∥str[c](const[2])).

On the other hand, if the length of the ciphertext C is not a multiple of b bits, the authenticator generation unit 215 updates the variable S by setting, to the variable S, data obtained by calculating an exclusive OR using as input the variable S calculated in step S24 and the constant const[3]. Here, the authenticator generation unit 215 calculates the exclusive OR using as input the variable S and data that is a bit string of c bits representing the constant const[3] to the beginning of which b bits of 0 are added. That is, the authenticator generation unit 215 calculates S=S XOR ($0^b$∥str[c](const[3])).

The authenticator generation unit 215 updates the variable S by setting, to the variable S, data obtained by calculating the encryption function E using as input the variable S that has been updated. That is, the authenticator generation unit 215 calculates S=$E_K$(S).

Then, the authenticator generation unit 215 extracts, as an authenticator T', t bits from the variable S that has been updated. Here, the authenticator generation unit 215 extracts the most significant t bits from the variable S, so as to generate the authenticator T'. That is, the authenticator generation unit 215 calculates T'=msb[t](S).

(Step S26: Message Generation Process)

The message generation unit 216 concatenates the respective pieces of the data M[i] for each integer i=1, . . . , m calculated in step S24. The ciphertext generation unit 116 extracts only the most significant bits of the length Len(C) of the ciphertext C from the concatenated data, so as to generate a message M that is the decrypted ciphertext C.

That is, the ciphertext generation unit 116 calculates M=msb[Len(C)](M[1]∥ . . . ∥M[m−1]∥M[m]).

(Step S27: Output Process)

If the authenticator T accepted in step S21 and the authenticator T' calculated in step S25 coincide with each other, the output unit 217 outputs the message M generated in step S25. Specifically, the output unit 217 transmits the message M to a display device or the like via the communication interface 24.

On the other hand, if the authenticator T accepted in step S21 and the authenticator T' calculated in step S26 do not coincide with each other, the output unit 217 outputs a message indicating that the authenticator T and the authenticator T' do not coincide with each other.

* Effects of First Embodiment *

As described above, the encryption device 10 and the decryption device 20 according to the first embodiment allow the construction of an authenticated encryption algorithm from the encryption function E of the block cipher and the exclusive OR (XOR) without using a decryption function of the block cipher. The size of the variable S, which is an internal variable, is n bits. Therefore, the size of the internal variable can be made smaller than that of the authenticated encryption algorithm JAMBU while the implementation size is equivalent to that of the authenticated encryption algorithm JAMBU.

* Other Configurations *

<First Variation>

In the first embodiment, the functions of the functional components of the encryption device 10 and the decryption device 20 are realized by software. As a first variation, however, the functions of the functional components of the encryption device 10 and the decryption device 20 may be realized by hardware. With respect to this first variation, differences from the first embodiment will be described.

Figure 7:
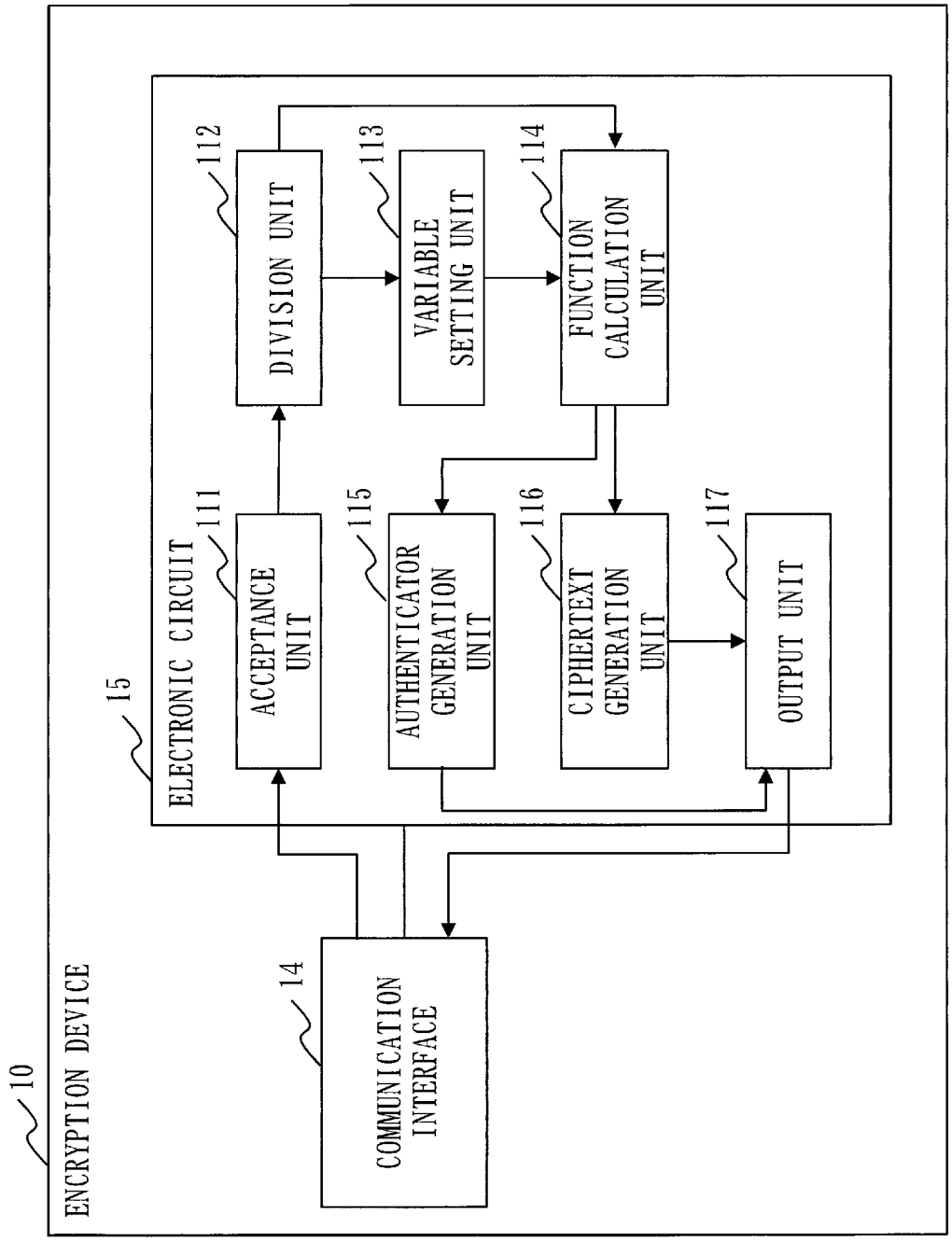
FIG. 7 is a configuration diagram of an encryption device 10 according to a first variation.

A configuration of an encryption device 10 according to the first variation will be described with reference to FIG. 7.

When the functions of the functional components are realized by hardware, the encryption device 10 includes an electronic circuit 15, in place of the processor 11, the memory 12, and the storage 13. The electronic circuit 15 is a dedicated electronic circuit that realizes the functions of the units of the encryption device 10 and the functions of the memory 12 and the storage 13.

Figure 8:
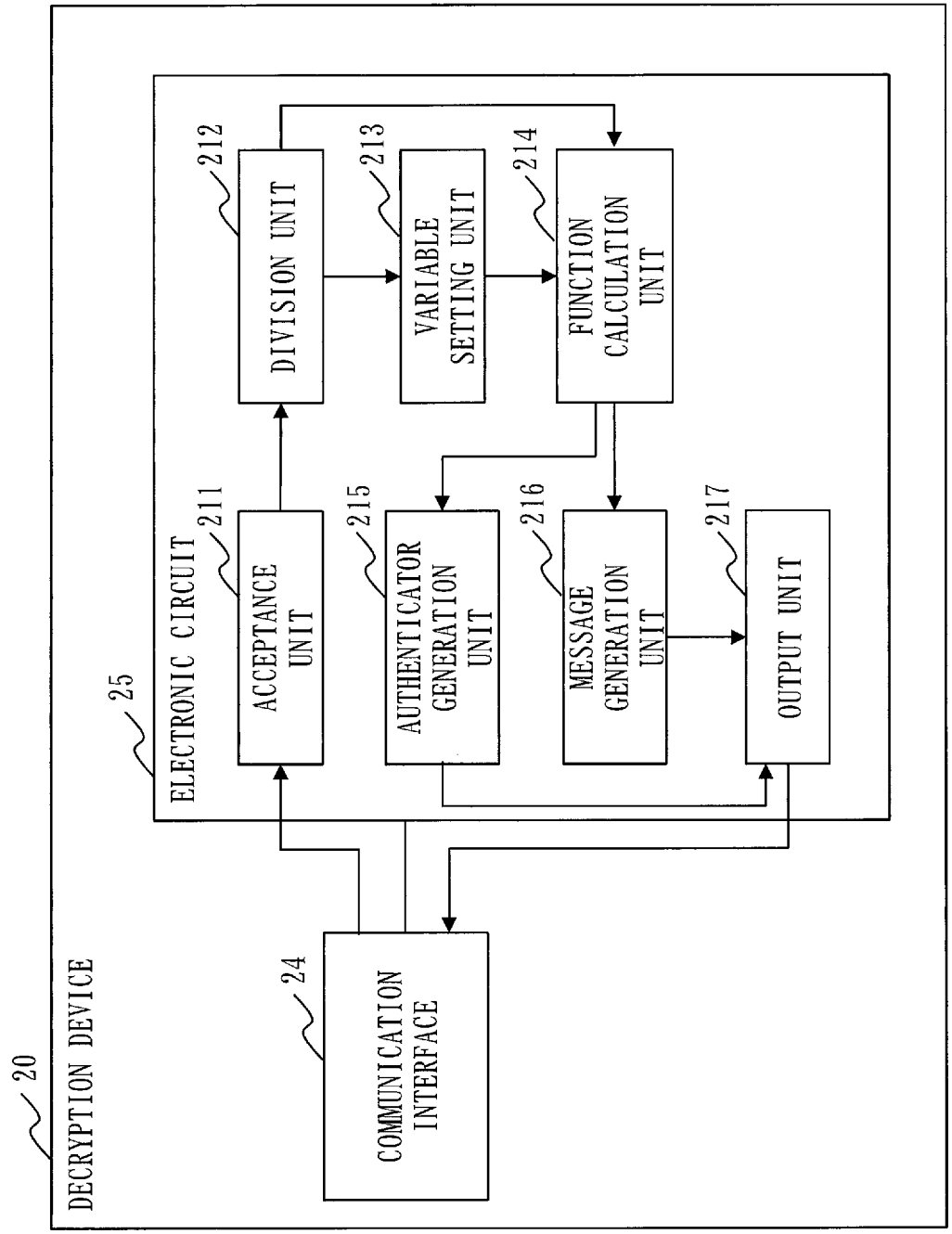
FIG. 8 is a configuration diagram of a decryption device 20 according to the first variation.

A configuration of a decryption device 20 according to the first variation will be described with reference to FIG. 8.

When the functions of the functional components are realized by hardware, the decryption device 20 includes an electronic circuit 25, in place of the processor 21, the memory 22, and the storage 23. The electronic circuit 25 is a dedicated electronic circuit that realizes the functions of the units of the decryption device 20 and the functions of the memory 22 and the storage 23.

Each of the electronic circuits 15 and 25 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the units of the encryption device 10 may be realized by a single electronic circuit 15. The functions of the units of the encryption device 10 may be distributed among and realized by a plurality of electronic circuits 15. Similarly, the functions of the units of the decryption device 20 may be realized by a single electronic circuit 25. The functions of the units of the decryption device 20 may be distributed among and realized by a plurality of electronic circuits 25.

<Second Variation>

As a second variation, some of the functions may be realized by hardware, and the rest of the functions may be realized by software. That is, some of the functions of the functional components of the encryption device 10 may be realized by hardware, and the rest of the functions may be realized by software. Similarly, some of the functions of the functional components of the decryption device 20 may be realized by hardware, and the rest of the functions may be realized by software.

Each of the processors 11 and 21, the memories 12 and 22, the storages 13 and 23, and the electronic circuits 15 and 25 is referred to as processing circuitry. That is, the functions of the units of the encryption device 10 and the decryption device 20 are realized by the processing circuitry.

Second Embodiment

A second embodiment differs from the first embodiment in that public data A is involved. In the second embodiment, this difference will be described and description of the same portions will be omitted.

* Description of Variables and Notation *

An integer b' and an integer c' satisfy the relationship c'=n−b'.

The value of const[4] and the value of const[5] are different from each other. The value of const[4] and the value of const[5] are different from the value of const[1].

* Description of Configuration *

Figure 9:
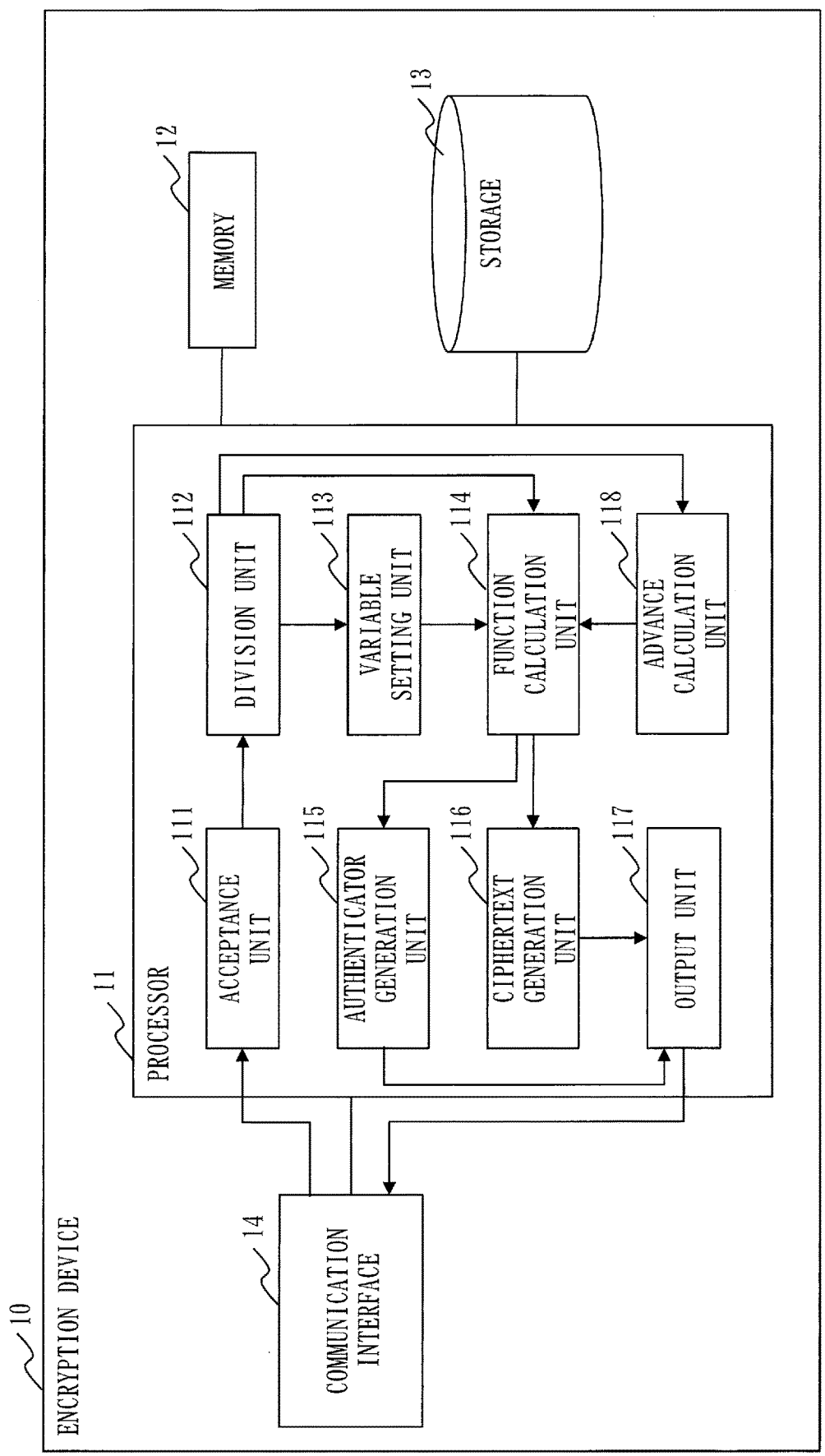
FIG. 9 is a configuration diagram of an encryption device 10 according to a second embodiment.

A configuration of an encryption device 10 according to the second embodiment will be described with reference to FIG. 9.

The encryption device 10 differs from the encryption device 10 illustrated in FIG. 1 in that an advance calculation unit 118 is included as a functional component. As with the other functional components, the advance calculation unit 118 is realized by software or hardware.

Figure 10:
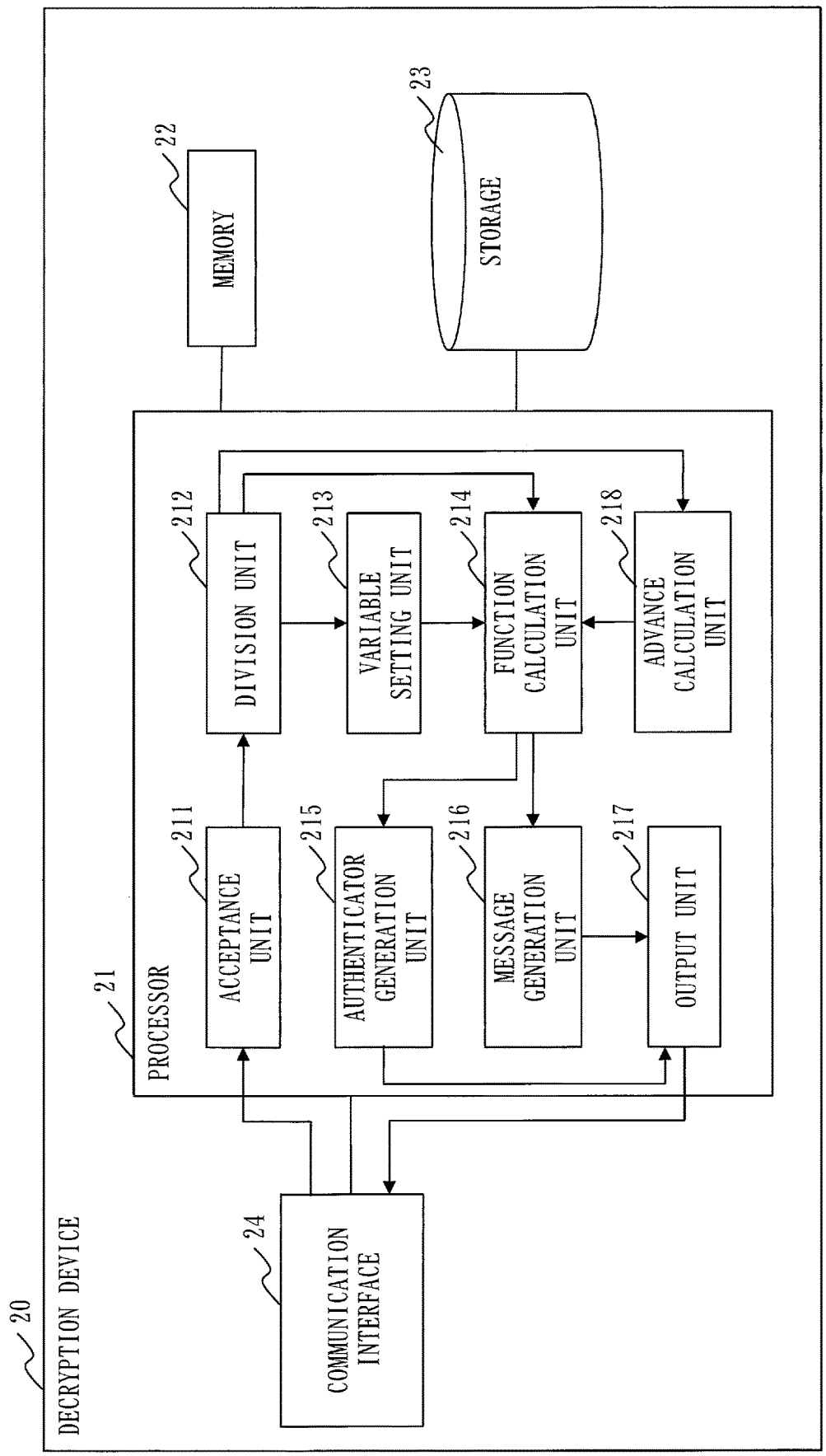
FIG. 10 is a configuration diagram of a decryption device 20 according to the second embodiment.

A configuration of a decryption device 20 according to the second embodiment will be described with reference to FIG. 10.

Figure 2:
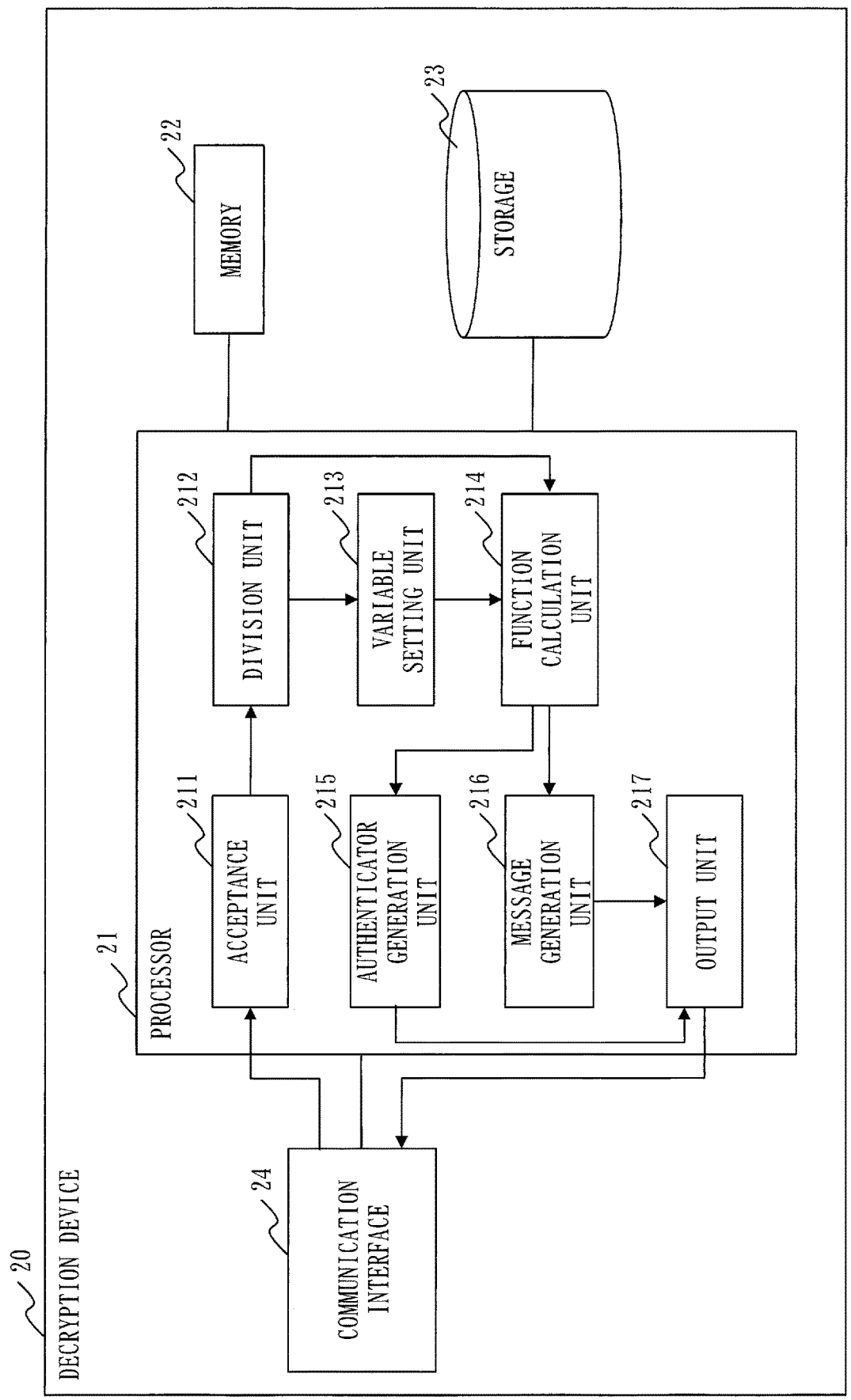
FIG. 2 is a configuration diagram of a decryption device 20 according to the first embodiment.

The decryption device 20 differs from the decryption device 20 illustrated in FIG. 2 in that an advance calculation unit 218 is included as a functional component. As with the other functional components, the advance calculation unit 218 is realized by software or hardware.

* Description of Operation *

Operation of the encryption device 10 and the decryption device 20 according to the second embodiment will be described with reference to FIGS. 11 and 12.

The operation of the encryption device 10 according to the second embodiment corresponds to an encryption method according to the second embodiment. The operation of the encryption device 10 according to the second embodiment also corresponds to processes of an encryption program according to the second embodiment.

The operation of the decryption device 20 according to the second embodiment corresponds to a decryption method according to the second embodiment. The operation of the decryption device 20 according to the second embodiment also corresponds to processes of a decryption program according to the second embodiment.

The operation of the encryption device 10 and the decryption device 20 according to the second embodiment will be described with reference to FIGS. 11 and 12.

Figure 3:
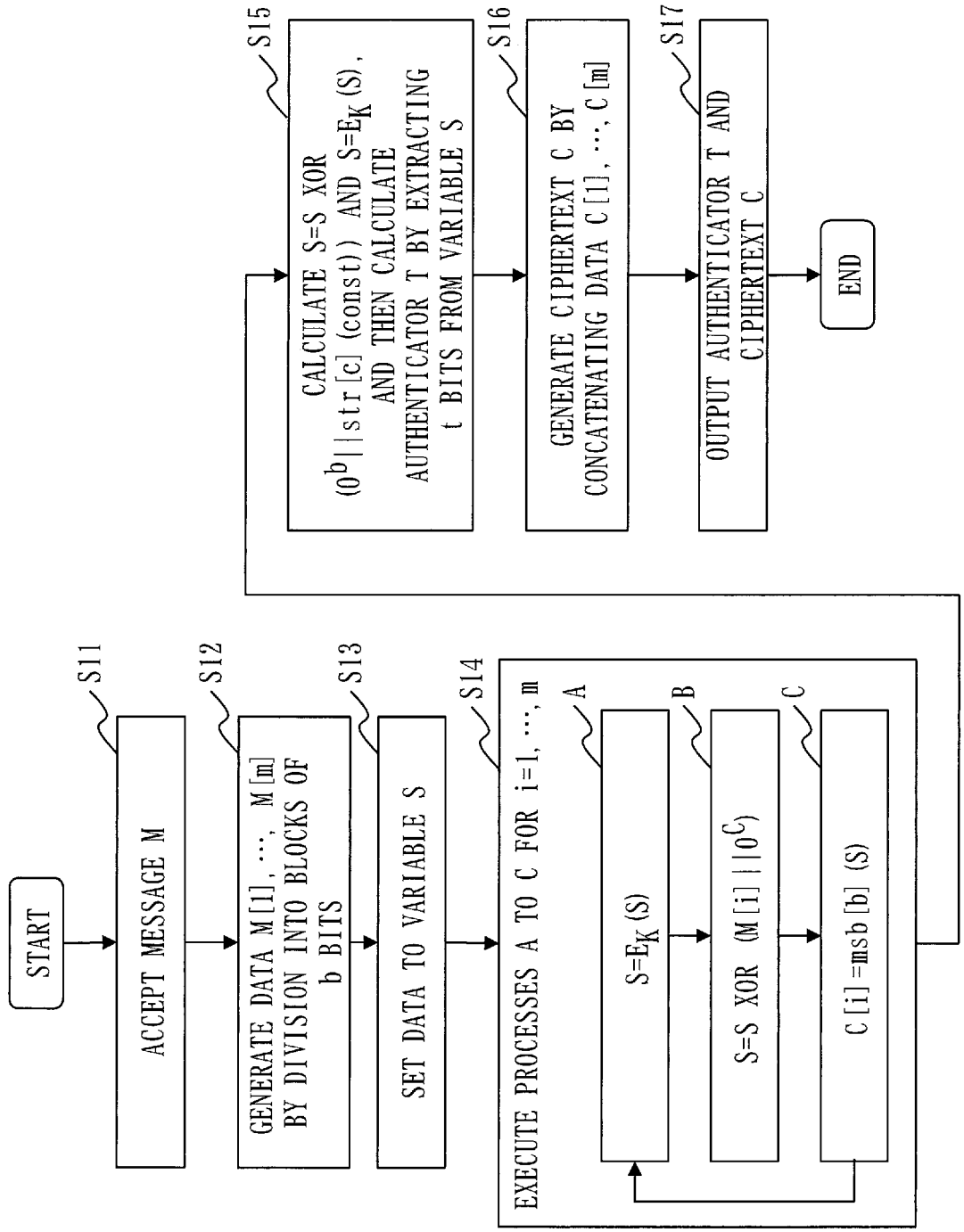
FIG. 3 is a flowchart illustrating operation of the encryption device 10 according to the first embodiment.
Figure 4:
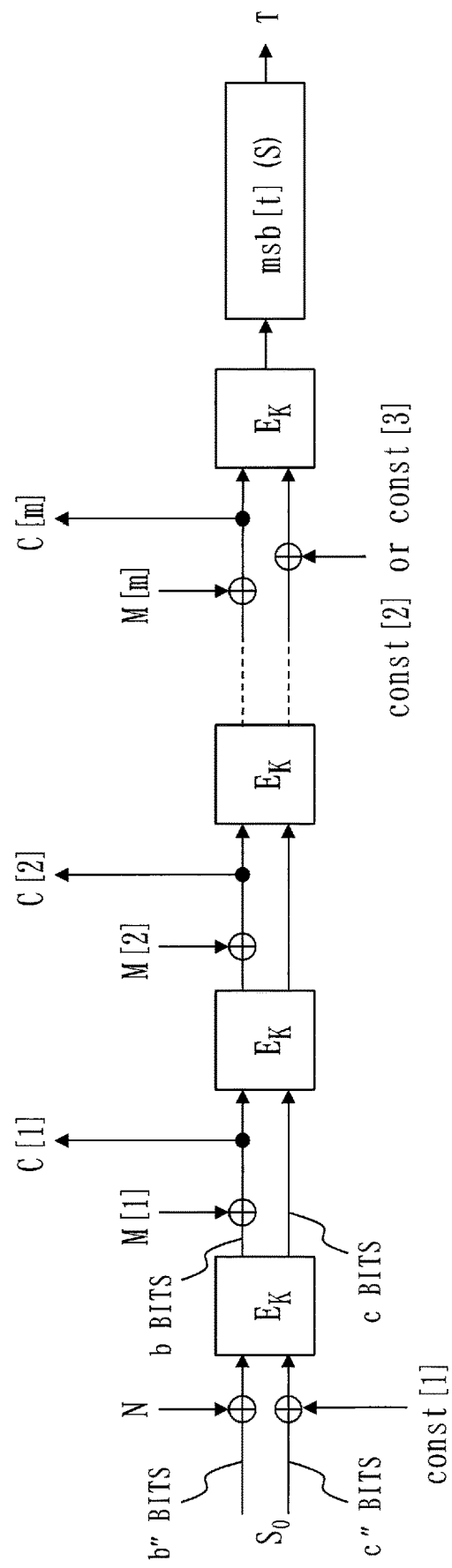
FIG. 4 is a diagram describing operation of the encryption device 10 according to the first embodiment.
Figure 11:
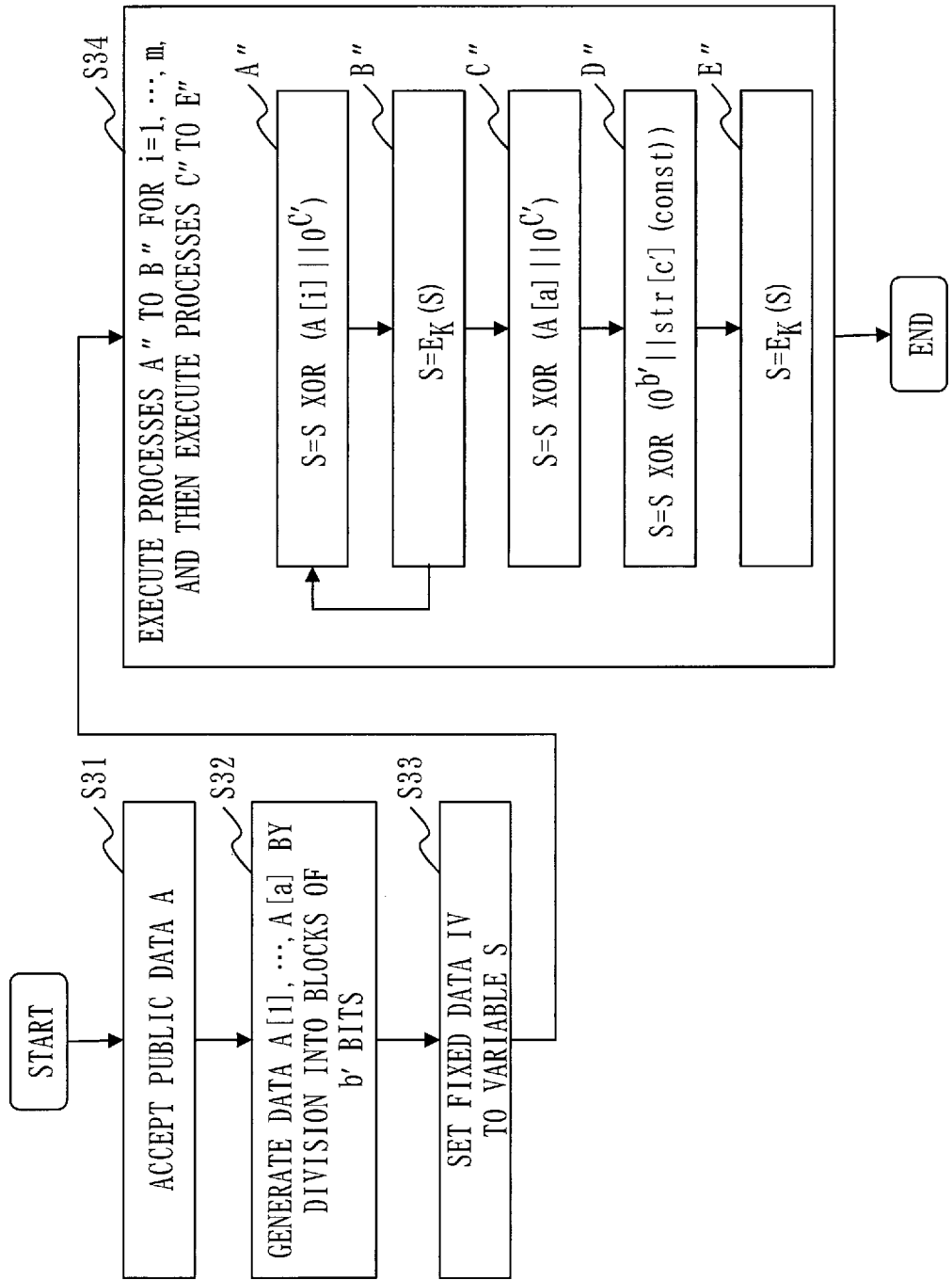
FIG. 11 is a flowchart illustrating operation of the encryption device 10 and the decryption device 20 according to the second embodiment.
Figure 12:
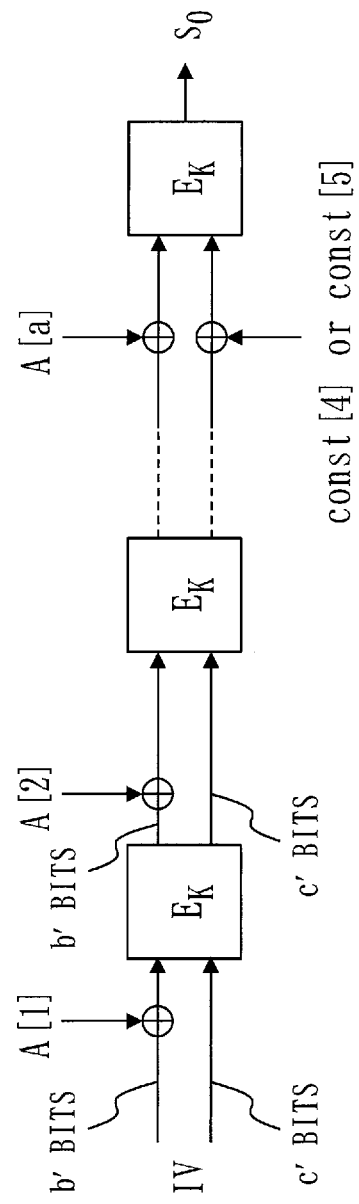
FIG. 12 is a diagram describing operation of the encryption device 10 and the decryption device 20 according to the second embodiment.

The encryption device 10 performs processes indicated in FIG. 11 and then executes processes indicated in FIG. 3. Specifically, the encryption device 10 executes the processes indicated in FIG. 3, using a variable S calculated in a process E" of FIG. 11 as data $S_0$ in step S13 of FIG. 3.

Figure 5:
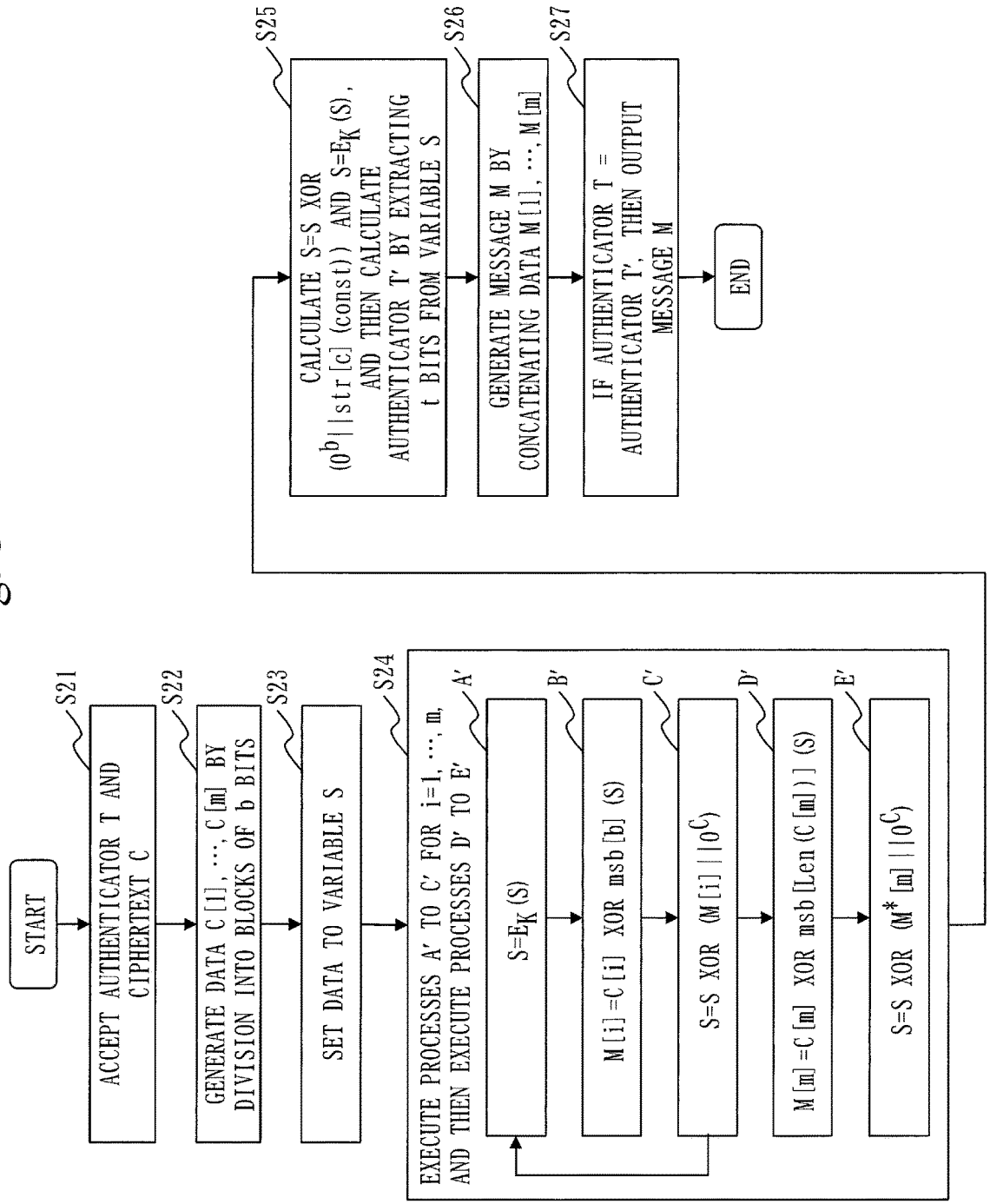
FIG. 5 is a flowchart illustrating operation of the decryption device 20 according to the first embodiment.
Figure 6:
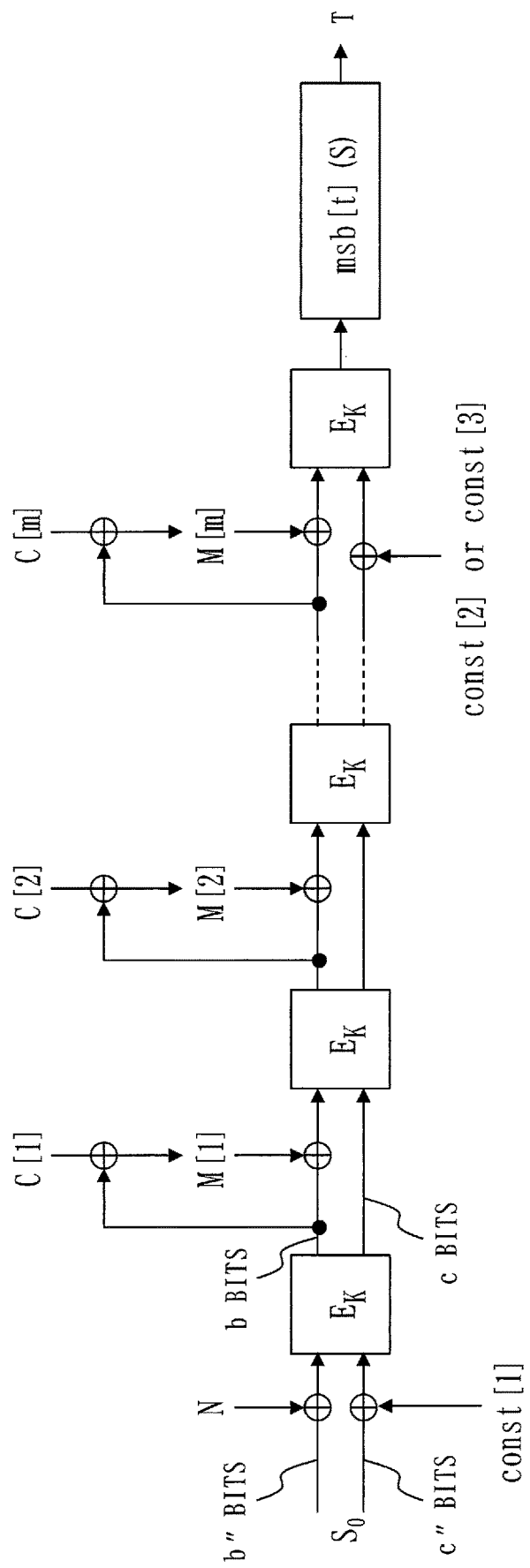
FIG. 6 is a diagram describing operation of the decryption device 20 according to the first embodiment.

Similarly, the decryption device 20 executes the processes indicated in FIG. 11 and then executes processes indicated in FIG. 5. Specifically, the decryption device 20 executes the processes indicated in FIG. 5, using a variable S calculated in the process E" of FIG. 11 as data $S_0$ in step S23 of FIG. 5.

In the following description, the execution of the processes indicated in FIG. 11 by the encryption device 10 will be described. For the execution of the processes indicated in FIG. 11 by the decryption device 20, the acceptance unit 111, the division unit 112, the advance calculation unit 118, and the communication interface 14 should be read as the acceptance unit 211, the division unit 212, the advance calculation unit 218, and the communication interface 24.

(Step S31: Acceptance Process)

The acceptance unit 111 accepts input of public data A.

Specifically, the acceptance unit 111 receives, via the communication interface 14, the public data A that is input by a user through operation of an input device. The acceptance unit 111 may obtain the public data A from an external server or the like.

(Step S32: Division Process)

The division unit 112 determines whether or not a length Len(A) of the public data A accepted in step S31 is a multiple of b' bits. If the length Len(A) is not a multiple of b' bits, 1 is added to the end of the pubic data A and a bit string of 0 is further added to the end so that the length Len(A) is a multiple of b' bits, so as to generate data A*. On the other hand, if the length Len(A) is a multiple of b' bits, the public data A is treated as the data A*.

The division unit 112 divides the data A* generated in step S32 into blocks of b' bits, so as to generate data A[1], . . . , data A[a] each having b' bits, where "a" is an integer of 1 or greater.

(Step S33: Variable Setting Process)

The variable setting unit 113 sets fixed data IV of n bits to a variable S internal to the encryption device 10. The fixed data IV is data whose least significant c' bits are different from those of const[1], const[2], const[3], const[4], and const[5].

(Step S34: Advance Calculation Process)

The advance calculation unit 118 executes the following processes A" to B" for each integer i=1, . . . , a−1 in ascending order. Then, processes C" to E" are executed.

(Process A")

The advance calculation unit 118 updates the variable S by setting, to the variable S, data obtained by calculating an exclusive OR using as input the variable S and data X*[i] that is data A[i] to which a bit string of c' bits is added. Here, the advance calculation unit 118 uses the data X*[i] that is the data A[i] to the end of which c' bits of 0 are added.

That is, the advance calculation unit 118 calculates S=S XOR (A[i]$\|0^{c'}$).

(Process B")

The advance calculation unit 118 updates the variable S by setting, to the variable S, data obtained by calculating the encryption function E using as input the variable S updated in the process A" and the key K.

That is, the advance calculation unit 118 calculates $S=E_K(S)$.

(Process C")

The advance calculation unit 118 updates the variable S by setting, to the variable S, data obtained by calculating an exclusive OR using as input the variable S and data X*[a] that is the data A[a] to which a bit string of c' bits is added. Here, the advance calculation unit 118 uses the data X*[a] that is the data A[a] to the end of which c' bits of 0 are added.

That is, the advance calculation unit 118 calculates S=S XOR (A[a]$\|0^{c'}$).

(Process D")

If the length of the public data A is a multiple of b' bits, the advance calculation unit 118 updates the variable S by setting, to the variable S, data obtained by calculating an exclusive OR using as input the variable S calculated in the process B" and a constant const[4]. Here, the advance calculation unit 118 calculates the exclusive OR using as input the variable S and data that is a bit string of c' bits representing the constant const[4] to the beginning of which b' bits of 0 are added. That is, the advance calculation unit 118 calculates S=S XOR ($0^b\|$str[c'](const[4])).

On the other hand, if the length of the public data A is not a multiple of b' bits, the advance calculation unit 118 updates the variable S by setting, to the variable S, data obtained by calculating an exclusive OR using as input the variable S calculated in the process B" and a constant const[5]. Here, the advance calculation unit 118 calculates the exclusive OR using as input the variable S and data that is a bit string of c' bits representing the constant const[5] to the beginning of which b' bits of 0 are added. That is, the advance calculation unit 118 calculates S=S XOR ($0^b\|$str[c'](const[5])).

(Process E")

The advance calculation unit 118 updates the variable S by setting, to the variable S, data obtained by calculating the encryption function E using as input the variable S updated in the process D". That is, the advance calculation unit 118 calculates $S=E_K(S)$.

* Effects of Second Embodiment *

As described above, the encryption device 10 and the decryption device 20 according to the second embodiment allow the construction of an authenticated encryption algorithm from the encryption function E of the block cipher and the exclusive OR (XOR) without using a decryption function of the block cipher, even when the public data A is involved. The size of the variable S, which is an internal variable, is n bits. Therefore, the size of the internal variable can be made smaller than that of the authenticated encryption algorithm JAMBU while the implementation size is equivalent to that of the authenticated encryption algorithm JAMBU.

Examples of the fixed data IV, const[1], const[2], const[3], const[4], and const[5] will be described. For example, the fixed data IV is $0^n$, const[1] is 3, const[2] is 1, const[3] is 2, const[4] is 1, and const[5] is 2. In this case, it is required that the integer c'≥3 and the integer c"≥3.

The value of the integer c is determined by taking security into consideration. In the authenticated encryption algorithms described in the first and second embodiments, security can be assured until the number of times the encryption function E of the block cipher is invoked in the encryption function Enc exceeds $2^{n/2}$ times, or the number of times the encryption function E of the block cipher is invoked upon failure of verification in the decryption function Dec exceeds $2^c$. When the number of times the encryption function E of the block cipher is invoked exceeds either of these numbers of times, the key K needs to be changed in order to assure security.

For example, when the number of times the encryption function E of the block cipher is invoked upon failure of verification in the decryption function Dec is limited to $2^{16}$, the minimum value of the integer c is 16.

REFERENCE SIGNS LIST

10: encryption device, 11: processor, 12: memory, 13: storage, 14: communication interface, 15: electronic circuit, 111: acceptance unit, 112: division unit, 113: variable setting unit, 114: function calculation unit, 115: authenticator generation unit, 116: ciphertext generation unit, 117: output unit, 118: advance calculation unit, 20: decryption device, 21: processor, 22: memory, 23: storage, 24: communication interface, 25: electronic circuit, 211: acceptance unit, 212: division unit, 213: variable setting unit, 214: function calculation unit, 215: authenticator generation unit, 216: message generation unit, 217: output unit, 218: advance calculation unit.

The invention claimed is:

1. An encryption device for an embedded device to confidentially and securely communicating an electronic message between two parties, the encryption device comprising:
processing circuitry to:
receive a message M;
divide the message M into blocks of b bits, so as to generate data M[1], . . . , data M[m],
set to a variable S data obtained by calculating an exclusive OR using, as input, data $S_0$ of n bits and data Y that is a concatenation of an initial parameter N and a constant const[1], where n, b, and c are integers and n=b+c,
update the variable S with data obtained by calculating an encryption function E of a block cipher using as input the variable S, then update the variable S with data obtained by calculating an exclusive OR using as input the variable S that has been updated and data X[i] that is data M[i] to which a bit string of c bits is added, generate data C[i] by extracting b bits from the variable S that has been updated, for each integer i=1, m in ascending order,
generate a ciphertext C of the message M by concatenating respective pieces of the data C[i] for each integer i=1, m,
generate an authenticator T of t bits from the variable S that has been updated most recently, where t is an integer of 1 or greater, the processing circuitry updating the variable S with data obtained by calculating an exclusive OR using as input the variable S and a constant const[2] when a length of the message M is a multiple of b bits, updating the variable S with data obtained by calculating an exclusive OR using as input the variable S and a constant const[3] that is different from the constant const[2] when the length of the message M is not a multiple of b bits, then updating the variable S with data obtained by calculating the encryption function E using as input the variable S that has been updated, and generating the authenticator T by extracting t bits from the variable S that has been updated,
transmit the generated authenticator T and ciphertext C to a decryption device.

2. The encryption device according to claim 1, wherein the processing circuitry divides public data A into blocks of b' bits, so as to generate data A[1], . . . , data A[a],
sets fixed data IV of n bits to the variable S,
updates the variable S with data obtained by calculating an exclusive OR using as input the variable S and data X*[i] that is data A[i] to which a bit string of c'=n−b' bits is added, then updates the variable S with data obtained by calculating the encryption function E using as input the variable S that has been updated, for each integer i=1, . . . , a in ascending order, and
uses, as the data $S_0$, the variable S that has been updated.

3. The encryption device according to claim 1,
wherein the data X[i] is the data M[i] to a least significant side of which a bit string of c bits is added, and
wherein the data C[i] is generated by extracting most significant b bits of the variable S.

4. A decryption device for an embedded device to confidentially and securely communicating an electronic message between two parties, the decryption device comprising:
processing circuitry to:
receive an authenticator T and a ciphertext C,
divide the ciphertext C into blocks of b bits, so as to generate data C[1], . . . , data C [m],
set to a variable S data obtained by calculating an exclusive OR using, as input, data $S_0$ of n bits and data Y that is a concatenation of an initial parameter N and a constant const[1], where n, b, and c are integers and n=b+c,
update the variable S with data obtained by calculating an encryption function E of a block cipher using as input the variable S, calculate data M[i] by calculating an exclusive OR using, as input, b bits extracted from the variable S that has been updated and data C[i], update the variable S with data obtained by calculating an exclusive OR using as input the variable S that has been updated and data X[i] that is the data M[i] to which a bit string of c bits is added, for each integer i=1, m in ascending order, generate a message M that is the decrypted ciphertext C by concatenating respective pieces of the data M[i] for each integer i=1, m, generate an authenticator T' of t bits from the variable S that has been updated most recently, where t is an integer of 1 or greater, the processing circuitry updating the variable S with data obtained by calculating an exclusive OR using as input the variable S and a constant const[2] when a length of the ciphertext C is a multiple of b bits, updating the variable S with data obtained by calculating an exclusive OR using as input the variable S and a constant const[3] that is different from the constant const[2] when the length of the message M is not a multiple of b bits, then updating the variable S with data obtained by calculating the encryption function E using as input the variable S that has been updated, and generating the authenticator T' by extracting t bits from the variable S that has been updated, and outputting, when the received authenticator T is equal to the generated authenticator T' the generated message M.

5. The decryption device according to claim 4, wherein the processing circuitry divides public data A into blocks of b' bits, so as to generate data A[1], . . . , data A[a], sets fixed data IV of n bits to the variable S, updates the variable S with data obtained by calculating an exclusive OR using as input the variable S and data X*[i] that is data A[i] to which a bit string of c'=n−b' bits is added, then updates the variable S with data obtained by calculating the encryption function E using as input the variable S that has been updated, for each integer i=1, . . . , a in ascending order, and uses, as the data $S_0$, the variable S that has been updated.

6. The decryption device according to claim 4, wherein the data X[i] is the data M[i] to a least significant side of which a bit string of c bits is added, and wherein the data C[i] is generated by extracting most significant b bits of the variable S.

7. The decryption device according to claim 4, wherein the processing circuitry determines whether or not the authenticator T' and an authenticator T corresponding to the message M coincide with each other.

8. An encryption method for an embedded device to confidentially and securely communicating an electronic message between two parties, the encryption method comprising:

receiving a message M, dividing the message M into blocks of b bits, so as to generate data M[1], . . . , data M[m];

setting a variable to set to a variable S data obtained by calculating an exclusive OR using, as input, data $S_0$ of n bits and data Y that is a concatenation of an initial parameter N and a constant const[1], where n, b, and c are integers and n=b+c;

updating the variable S with data obtained by calculating an encryption function E of a block cipher using as input the variable S, then updating the variable S with data obtained by calculating an exclusive OR using as input the variable S that has been updated and data X[i] that is data M[i] to which a bit string of c bits is added, and generating data C[i] by extracting b bits from the variable S that has been updated, for each integer i=1, m in ascending order;

generating a ciphertext C of the message M by concatenating respective pieces of the data C[i] for each integer i=1, m; and updating the variable S with data obtained by calculating an exclusive OR using as input the variable S that has been updated most recently and a constant const[2] when a length of the message M is a multiple of b bits, updating the variable S with data obtained by calculating an exclusive OR using as input the variable S that has been updated most recently and a constant const[3] that is different from the constant const[2] when the length of the message M is not a multiple of b bits, then updating the variable S with data obtained by calculating the encryption function E using as input the variable S that has been updated, and generating an authenticator T oft bits from the variable S that has been updated, where t is an integer of 1 or greater; and transmitting the generated authenticator T and ciphertext C to a decryption device.

9. A decryption method for an embedded device to confidentially and securely communicating an electronic message between two parties, the decryption method comprising:

receiving an authenticator T and a ciphertext C;

dividing the ciphertext C into blocks of b bits, so as to generate data C[1], . . . , data C[m];

setting a variable to set to a variable S data obtained by calculating an exclusive OR using, as input, data $S_0$ of n bits and data Y that is a concatenation of an initial parameter N and a constant const[1], where n, b, and c are integers and n=b+c;

updating the variable S with data obtained by calculating an encryption function E of a block cipher using as input the variable S, calculating data M[i] by calculating an exclusive OR using, as input, b bits extracted from the variable S that has been updated and data C[i], and updating the variable S with data obtained by calculating an exclusive OR using as input the variable S that has been updated and data X[i] that is the data M[i] to which a bit string of c bits is added, for each integer i=1, m in ascending order;

generating a message M that is the decrypted ciphertext C by concatenating respective pieces of the data M[i] for each integer i=1, m;

updating the variable S with data obtained by calculating an exclusive OR using as input the variable S that has been updated most recently and a constant const[2] when a length of the ciphertext C is a multiple of b bits, updating the variable S with data obtained by calculating an exclusive OR using as input the variable S that has been updated most recently and a constant const[3] that is different from the constant const[2] when the length of the message M is not a multiple of b bits, then updating the variable S with data obtained by calculating the encryption function E using as input the variable S that has been updated, and generating an authenticator T' oft bits from the variable S that has been updated, where t is an integer of 1 or greater; and outputting, when the received authenticator T is equal to the generated authenticator T' the generated message M.

10. A non-transitory computer readable medium storing an encryption program for an embedded device to confidentially and securely communicating an electronic message between two parties, the encryption program causing a computer to execute:

a reception process to receive a message M;

a division process to divide the message M into blocks of b bits, so as to generate data M[1], . . . , data M[m];

a variable setting process to set to a variable S data obtained by calculating an exclusive OR using, as input, data $S_0$ of n bits and data Y that is a concatenation of an initial parameter N and a constant cons-[1], where n, b, and c are integers and n=b+c;

a function calculation process to update the variable S with data obtained by calculating an encryption function E of a block cipher using as input the variable S, then update the variable S with data obtained by calculating an exclusive OR using as input the variable S that has been updated and data X[i] that is data M[i] to which a bit string of c bits is added, and generate data C[i] by extracting b bits from the variable S that has been updated, for each integer i=1, m in ascending order;

a ciphertext generation process to generate a ciphertext C of the message M by concatenating respective pieces of the data C[i] for each integer i=1, m;

an authenticator generation process to generate an authenticator T of t bits from the variable S that has been updated most recently by the function calculation process, where t is an integer of 1 or greater, the authenticator generation process updating the variable S with data obtained by calculating an exclusive OR using as input the variable S and a constant const[2] when a length of the message M is a multiple of b bits, updating the variable S with data obtained by calculating an exclusive OR using as input the variable S and a constant const[3] that is different from the constant const[2] when the length of the message M is not a multiple of b bits, then updating the variable S with data obtained by calculating the encryption function E using as input the variable S that has been updated, and generating the authenticator T by extracting t bits from the variable S that has been updated; and a transmission process to transmit the generated authenticator T and ciphertext C to a decryption device.

11. A non-transitory computer readable medium storing a decryption program for an embedded device to confidentially and securely communicating an electronic message between two parties, the decryption program causing a computer to execute:

a reception process to receive an authenticator T and ciphertext C;

a division process to divide a ciphertext C into blocks of b bits, so as to generate data C[1], . . . , data C[m];

a variable setting process to set to a variable S data of obtained by calculating an exclusive OR using, as input, data $S_0$ of n bits and data Y that is a concatenation of an initial parameter N and a constant cons-[1], where n, b, and c are integers and n=b+c;

a function calculation process to update the variable S with data obtained by calculating an encryption function E of a block cipher using as input the variable S, calculate data M[i] by calculating an exclusive OR using, as input, b bits extracted from the variable S that has been updated and data C[i], and update the variable S with data obtained by calculating an exclusive OR using as input the variable S that has been updated and data X[i] that is the data M[i] to which a bit string of c bits is added, for each integer i=1, m in ascending order;

a message generation process to generate a message M that is the decrypted ciphertext C by concatenating respective pieces of the data M[i] for each integer i=1, m; and an authenticator generation process to generate an authenticator T' of t bits from the variable S that has been updated most recently by the function calculation process, where t is an integer of 1 or greater, the authenticator generation process updating the variable S with data obtained by calculating an exclusive OR using as input the variable S and a constant const[2] when a length of the ciphertext C is a multiple of b bits, updating the variable S with data obtained by calculating an exclusive OR using as input the variable S and a constant const[3] that is different from the constant const[2] when the length of the message M is not a multiple of b bits, then updating the variable S with data obtained by calculating the encryption function E using as input the variable S that has been updated, and generating the authenticator T' by extracting t bits from the variable S that has been updated;

an output process to output, when the received authenticator T is equal to the generated authenticator T', the generated message M.

* * * * *